G. W. EVANS.
INSECT DESTROYER.
APPLICATION FILED JAN. 22, 1914.
1,119,502.
Patented Dec. 1, 1914.
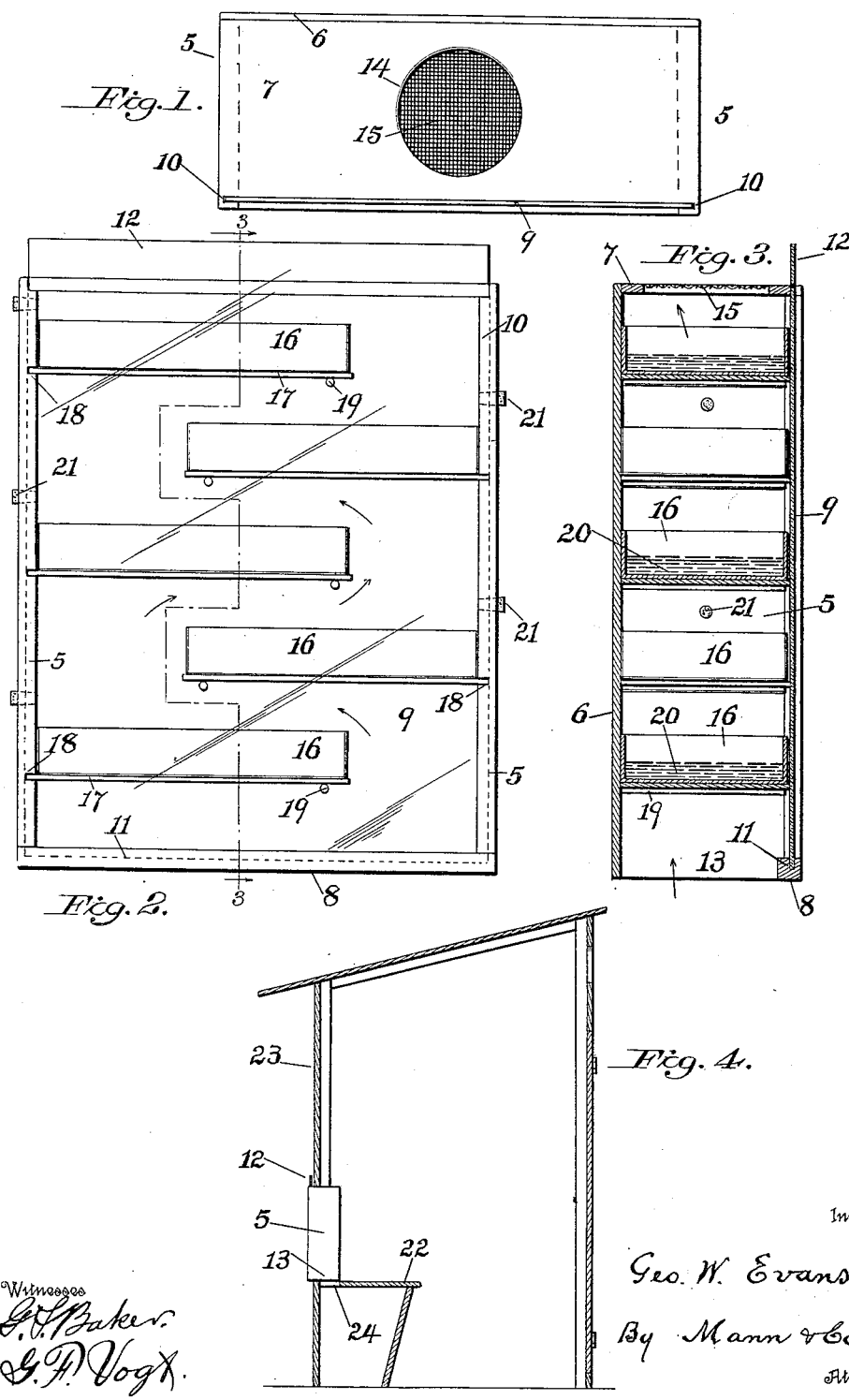

UNITED STATES PATENT OFFICE.

GEORGE W. EVANS, OF TUXEDO PARK, MARYLAND.

INSECT-DESTROYER.

1,119,502.     Specification of Letters Patent.     Patented Dec. 1, 1914.

Application filed January 22, 1914. Serial No. 813,619.

*To all whom it may concern:*

Be it known that I, GEORGE W. EVANS, a citizen of the United States, residing at Tuxedo Park, in the county of Baltimore and State of Maryland, have invented certain new and useful Improvements in Insect-Destroyers, of which the following is a specification.

This invention relates to a new and improved insect destroyer.

One object of the invention is to provide an insect destroyer particularly adapted for use at cesspools, cisterns, privy-houses, foul drains, sewers, and other places where noxious matter or odors attract insects.

Another object of the invention is to provide an insect destroyer having receptacles wherein may be exposed agents or materials of the insecticide type that are poisonous or destructive to such insect life as flies, mosquitos, gnats, fleas, and other insects.

The subject-matter of this invention is illustrated in the accompanying drawing, in which, Figure 1 is a top view of the case of the insect destroyer. Fig. 2 is a front elevation of the case. Fig. 3 is a vertical section of the case on the line 3—3 of Fig. 2. Fig. 4 is a vertical section of a privy-house showing one way of positioning therein the case of the insect destroyer.

The numeral, 5, designates the two side walls of the case; 6, the back wall that connects said two side walls; 7, the flat top; and, 8, designates a horizontal base-bar that has position at the bottom and front where it connects the said two side walls, 5. The front wall, 9, of the case consists of a vertical glass plate large enough to cover the entire front; this plate, 9, fits loosely in two vertical grooves, 10, one such groove being formed in each side-wall, 5, which permits the glass plate to slide up. The horizontal base-bar, 8, also has in its upper side a groove, 11, which receives the lower edge of the glass plate. The upper edge, 12, of the plate projects above the flat top, and this projecting portion may be grasped by a person's hands when, for any reason, it is desired to slide the plate upward. The space, 13, at the bottom between the back wall, 6, and the base-bar, 8, and between the two side walls, 5, is entirely open; this open bottom permits the case to be placed over an opening in the seat of a privy house, sewer opening or other noxious place. The top, 7, of the case has an opening, 14, in which a wire-screen, 15, is placed. When the front glass plate, 9, is in its closed position, as shown in Figs. 2 and 3, all four sides of the case are closed; the only openings being at the bottom, 13, and the top wire-screen, 15. The interior of the case contains shallow flat receptacles or pans, 16, of material suitable to hold liquid. As the pans are independent of each other and have no connection, liquid cannot pass from one pan to another. These pans have a level or horizontal position and are rectangular in shape in order to fit closely in the corners of the case, and each pan is supported on a shelf, 17, one end of which fits in a slot or groove, 18, cut into one of the side walls, 5, see Fig. 2, and the other end of said shelf is sustained on a horizontal pin or rod, 19, that projects from the back wall, 6. The pans, 16, are free on these shelves, 17. The lengthwise dimension of the pans is about equal to two thirds of the crosswise dimension of the interior of the case, and the width of the pans is exactly the same as the interior width of the case between the back wall, 6, and the front glass plate, 9. The pans are spaced apart and supported one above another, and are so placed as to form a zig-zag passageway between the open bottom of the case and the screened open top of the case, as shown in Fig. 2. In Fig. 3 the lowermost pan, 16, in the case is shown in cross-section, and an end view is shown of the second pan from the bottom of the case, and of the five pans shown in this figure every other one is in cross-section; this arrangement of illustration in Fig. 3 is indicated by the line 3—3 in Fig. 2. It will be understood that any draft of air in an upward direction through this case, will follow the zig-zag passageway.

The pans, 16, contain powder or liquid material, 20, of an insecticide nature. Coal oil or petroleum is useful for this purpose because it is destructive to mosquitos, flies and other insects. In order to supply the pans with such liquid a hole is made in the side-wall, 5, above each pan; this hole permits the insertion from the outside of the end of a bent tube of a funnel, (not shown) and by such means liquid, 20, may be placed in the pan. A plug, 21, is employed to close each hole.

Fig. 4 illustrates a privy-house with an ordinary seat, 22, and the case, 5, of the insect destroyer inserted in an opening cut in the wall, 23, of the house, and the open bottom, 13, of the said case over a slot, 24, in the seat; the glass plate, 9, is exposed to the light on the outer side of said house-wall, 23.

It will be seen that the only way for insects to enter the case is through the open bottom, 13; as soon as they enter they will either fly or crawl by way of the zig-zag passage. As the insects pass successively over the open pans the fumes of the liquid overcomes them and they fall into one pan or another. As the open top of one pan is partly below the shelf, 17, above it, these shelves serve as baffles, buffets or deflectors and cause the insects to fall into the pan below.

The zig-zag passageway serves both as a vent-flue for gases and odors and also as a passage for the insects.

Having thus described my invention what I claim and desire to secure by Letters Patent is:—

1. An insect destroyer having in combination a rectangular case consisting of four walls which at the bottom is entirely open and at the top has a cover provided with a screened opening; a plural number of shelves within the case, each shelf being rectangular in shape and of width to completely fill the space between the back and front walls of the case and having a length less than the cross dimension between the two side walls—said shelves being one above another and every succeeding shelf having one end contacting with an opposite side wall, and a shallow pan resting on each shelf said pans adapted to contain material of an insecticide nature.

2. An insect destroyer having in combination a rectangular case consisting of two side walls each provided with a vertical groove, and also provided with holes through which liquid may be supplied, a back wall connecting the two side walls, a glass plate slidable in said vertical grooves and serving as a front wall—said side, back and front walls forming an open bottom; a cover at the top of the walls; a plural number of shallow pans having a horizontal position within the case said pans closing the interior space between back wall and front glass plate, and the pans independently supported one above another and forming in the case an irregular upward passageway for gases and insects, and plugs inserted in the liquid-supply holes formed in said side walls above each pan.

In testimony whereof I affix my signature in presence of two witnesses.

GEORGE W. EVANS.

Witnesses:
CHAS. B. MANN,
G. FERD. VOGT.